United States Patent [19]
Armstrong et al.

[11] Patent Number: 5,958,106
[45] Date of Patent: *Sep. 28, 1999

[54] METHOD OF MAKING METALS AND OTHER ELEMENTS FROM THE HALIDE VAPOR OF THE METAL

[75] Inventors: Donn Reynolds Armstrong, Lisle; Stanley S. Borys, Naperville; Richard Paul Anderson, Clarendon Hills, all of Ill.

[73] Assignee: International Titanium Powder, L.L.C., Willowbrook, Ill.

[*] Notice: This patent is subject to a terminal disclaimer.

[21] Appl. No.: 08/782,816

[22] Filed: Jan. 13, 1997

Related U.S. Application Data

[63] Continuation-in-part of application No. 08/691,423, Aug. 19, 1996, Pat. No. 5,779,761, which is a continuation of application No. 08/283,358, Aug. 1, 1994, abandoned.

[51] Int. Cl.$^6$ .................................................. B22F 1/00
[52] U.S. Cl. .......................... 75/370; 75/371; 75/605; 75/613; 75/616; 75/619; 75/620
[58] Field of Search ............................. 75/370, 371, 605, 75/613, 616, 619, 620

[56] References Cited

U.S. PATENT DOCUMENTS 5,779,761  7/1998  Armstrong et al. ................... 75/370

FOREIGN PATENT DOCUMENTS 4301785  8/1989  Australia .
0299791  7/1988  European Pat. Off. .

Primary Examiner—Kathryn Gorgos
Assistant Examiner—Thomas H. Parsons
Attorney, Agent, or Firm—Emrich & Dithmar

[57] ABSTRACT

A method of producing a non-metal element or a metal or an alloy thereof from a halide or mixtures thereof. The halide or mixtures thereof are contacted with a stream of liquid alkali metal or alkaline earth metal or mixtures thereof in sufficient quantity to convert the halide to the non-metal or the metal or alloy and to maintain the temperature of the reactants at a temperature lower than the sintering temperature of the produced non-metal or metal or alloy. A continuous method is disclosed, particularly applicable to titanium.

40 Claims, 4 Drawing Sheets

METHOD OF MAKING METALS AND OTHER ELEMENTS FROM THE HALIDE VAPOR OF THE METAL

RELATED APPLICATIONS

This is a continuation-in-part of our previously filed application, Ser. No. 08/691,423, filed Aug. 2, 1996, now U.S. Pat. No. 5,779,761 which was a file wrapper continuation of Ser. No. 08/283,358, filed Aug. 1, 1994 (now abandoned).

BACKGROUND OF THE INVENTION

This invention relates to the production of elemental material from the halides thereof and has particular applicability to those metals and non-metals for which the reduction of the halide to the element is exothermic. Particular interest exists for titanium, and the present invention will be described with particular reference to titanium but is applicable to other metals and non-metals such as Al, As, Sb, Be, B, Ta, Ge, V, Nb, Mo, Ga, Ir, Os, U and Re, all of which produce significant heat upon reduction from the halide to the metal. For the purposes of this application, elemental materials include those metals and non-metals listed above or in Table 1.

At present, titanium production is by reduction of titanium tetrachloride, which is made by chlorinating relatively high-grade titanium dioxide ore. Ores containing rutile can be physically concentrated to produce a satisfactory chlorination feed material; other sources of titanium dioxide, such as ilmenite, titaniferous iron ores and most other titanium source materials, require chemical beneficiation.

The reduction of titanium tetrachloride to metal has been attempted using a number of reducing agents including hydrogen, carbon, sodium, calcium, aluminum and magnesium. Both the magnesium and sodium reduction of titanium tetrachloride have proved to be commercial methods for producing titanium metal. However, current commercial methods use batch processing which requires significant material handling with resulting opportunities for contamination and gives quality variation from batch to batch. The greatest potential for decreasing production cost is the development of a continuous reduction process with attendant reduction in material handling. There is a strong demand for both the development of a process that enables continuous economical production of titanium metal and for the production of metal powder suitable for use without additional processing for application to powder metallurgy or for vacuum-arc melting to ingot form.

The Kroll process and the Hunter process are the two present day methods of producing titanium commercially. In the Kroll process, titanium tetrachloride is chemically reduced by magnesium at about 1000° C. The process is conducted in a batch fashion in a metal retort with an inert atmosphere, either helium or argon. Magnesium is charged into the vessel and heated to prepare a molten magnesium bath. Liquid titanium tetrachloride at room temperature is dispersed dropwise above the molten magnesium bath. The liquid titanium tetrachloride vaporizes in the gaseous zone above the molten magnesium bath. A reaction occurs on the molten magnesium surface to form titanium and magnesium chloride. The Hunter process is similar to the Kroll process, but uses sodium instead of magnesium to reduce the titanium tetrachloride to titanium metal and produces sodium chloride as a by product.

For both processes, the reaction is uncontrolled and sporadic and promotes the growth of dendritic titanium metal. The titanium fuses into a mass that encapsulates some of the molten magnesium (or sodium) chloride. This fused mass is called titanium sponge. After cooling of the metal retort, the solidified titanium sponge metal is broken up, crushed, purified and then dried in a stream of hot nitrogen. Metal ingots are made by compacting the sponge, welding pieces into an electrode and then melting it into an ingot in a high vacuum arc furnace. High purity ingots require multiple arc melting operations. Powder titanium is usually produced from the sponge through grinding, shot casting or centrifugal processes. A common technique is to first react the titanium with hydrogen to make brittle titanium hydride to facilitate the grinding process. After formation of the powder titanium hydride, the particles are dehydrogenated to produce a usable metal powder product. The processing of the titanium sponge into a usable form is difficult, labor intensive, and increases the product cost by a factor of two to three.

The processes discussed above have several intrinsic problems that contribute heavily to the high cost of titanium production. Batch process production is inherently capital and labor intensive. Titanium sponge requires substantial additional processing to produce titanium in a usable form; thereby increasing cost, increasing hazard to workers and exacerbating batch quality control difficulties. Neither process utilizes the large exothermic energy reaction, requiring substantial energy input for titanium production (approximately 6 kW-hr/kg product metal). In addition, the processes generate significant production wastes that are of environmental concern.

SUMMARY OF THE INVENTION

Accordingly, an object of the present invention is to provide a method and system for producing non-metals or metals or alloys thereof which is continuous having significant capital and operating costs advantages over existing batch technologies.

Another object of the present invention is to provide an improved batch or semi-batch process for producing non-metals or metals or alloys thereof where continuous operations are not warranted by the scale of the production.

Another object of the present invention is to provide a method and system for producing metals and non-metals from the exothermic reduction of the halide while preventing the metal or non-metal from sintering into large masses or onto the apparatus used to produce same.

Still another object of the invention is to provide a method and system for producing non-metal or metal from the halides thereof wherein the process and system recycles the reducing agent and removes the heat of reaction for use as process heat or for power generation, thereby substantially reducing the environmental impact of the process.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

The process of the invention may be practiced with the use of any alkali or alkaline earth metal depending upon the metal or non-metal to be reduced. In some cases, combinations of an alkali or alkaline earth metals may be used. Moreover, any halide or combinations of halides may be used with the present invention although in most circumstances chlorine, being the cheapest and most readily available, is preferred. Of the alkali or alkaline earth metals, by way of example, sodium will be chosen not for purposes of limitation but merely purposes of illustration, because it is cheapest and preferred, as has chlorine been chosen for the same purpose.

Regarding the non-metals or metals to be reduced, it is possible to reduce a single metal such as titanium or tantalum or zirconium, selected from the list set forth hereafter. It is also possible to make alloys of a predetermined composition by providing mixed metal halides at the beginning of the process in the required molecular ratio. By way of example, Table 1 sets forth heats of reaction per gram of sodium for the reduction of non-metal or metal halides applicable to the inventive process.

TABLE 1

| FEEDSTOCK | HEAT kJ/g |
|---|---|
| $TiCl_4$ | 10 |
| $AlCl_3$ | 9 |
| $SbCl_3$ | 14 |
| $BeCl_2$ | 10 |
| $BCl_3$ | 12 |
| $TaCl_5$ | 11 |
| $VCl_4$ | 12 |
| $NbCl_5$ | 12 |
| $MoCl_4$ | 14 |
| $GaCl_3$ | 11 |
| $UF_6$ | 10 |
| $ReF_6$ | 17 |

The process will be illustrated, again for purposes of illustration and not for limitation, with a single metal titanium being produced from the tetrachloride.

Figure 1:
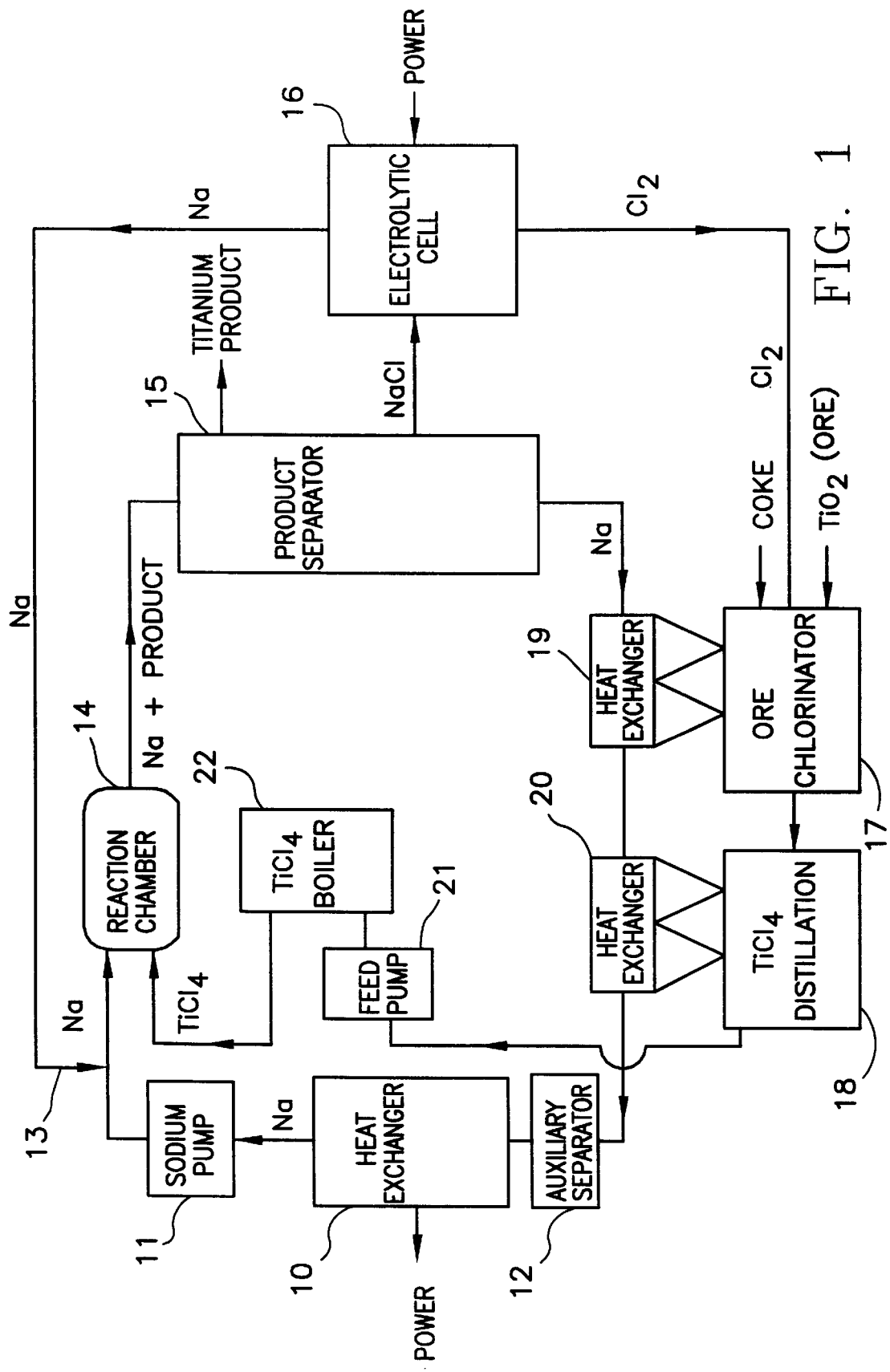
FIG. 1 is a process flow diagram showing the continuous process for producing as an example titanium metal from titanium tetrachloride.

A summary process flowsheet is shown in FIG. 1. Sodium and titanium tetrachloride are combined in a reaction chamber 14 where titanium tetrachloride vapor from a source thereof in the form of a boiler 22 is injected within a flowing sodium stream from a continuously cycling loop thereof including a sodium pump 11. The sodium stream is replenished by sodium provided by an electrolytic cell 16. The reduction reaction is highly exothermic, forming molten reaction products of titanium and sodium chloride. The molten reaction products are quenched in the bulk sodium stream. Particle sizes and reaction rates are controlled by metering of the titanium tetrachloride vapor flowrate (by controlling the supply pressure), dilution of the titanium tetrachloride vapor with an inert gas, such as He or Ar, and the sodium flow characteristics and mixing parameters in the reaction chamber which includes a nozzle for the titanium tetrachloride and a surrounding conduit for the liquid sodium. The vapor is intimately mixed with the liquid in a zone enclosed by the liquid, i.e., a liquid continuum, and the resultant temperature, significantly affected by the heat of reaction, is controlled by the quantity of flowing sodium and maintained below the sintering temperature of the produced metal, such as for titanium at about 1000° C. Preferably, the temperature of the sodium away from the location of halide introduction is maintained in the range of from about 200° C. to about 400° C. Products leaving the reaction zone are quenched in the surrounding liquid without contact with the walls of the reaction chamber or with other product particles. This precludes sintering and wall erosion.

The surrounding sodium stream then carries the titanium and sodium chloride reaction products away from the reaction region. These reaction products are removed from the bulk sodium stream by conventional separators 15 such as cyclones, particulate filters, magnetic separators or vacuum stills.

Two separate options for separation of the titanium and the sodium chloride exist. The first option removes the titanium and sodium chloride products in separate steps. This is accomplished by maintaining the bulk stream temperature such that the titanium is solid but the sodium chloride is molten through control of the ratio of titanium tetrachloride and sodium flowrates to the reaction chamber 14. For this option, the titanium is removed first, the bulk stream cooled to solidify the sodium chloride, then the sodium chloride is removed from separator 12.

In the second option for reaction product removal, a lower ratio of titanium tetrachloride to sodium flowrate would be maintained in the reaction chamber 14 so that the bulk sodium temperature would remain below the sodium chloride solidification temperature. For this option, titanium and sodium chloride would be removed simultaneously using conventional separators. The sodium chloride and any residual sodium present on the particles would then be removed in a water-alcohol wash.

Following separation, the sodium chloride is then recycled to the electrolytic cell 16 to be regenerated. The sodium is returned to the bulk process stream for introduction to reaction chamber 14 and the chlorine is used in the ore chlorinator 17. It is important to note that while both electrolysis of sodium chloride and subsequent ore chlorination will be performed using technology well known in the art, such integration and recycle of the reaction by-product directly into the process is not possible with the Kroll or Hunter process because of the batch nature of those processes and the production of titanium sponge as an intermediate product. In addition, excess process heat is removed in heat exchanger 10 for co-generation of power. The integration of these separate processes enabled by the inventive chemical manufacturing process has significant benefits with respect to both improved economy of operation and substantially reduced environmental impact achieved by recycle of both energy and chemical waste streams.

Chlorine from the electrolytic cell 16 is used to chlorinate titanium ore (rutile, anatase or ilmenite) in the chlorinator 17. In the chlorination stage, the titanium ore is blended with coke and chemically converted in the presence of chlorine in a fluidized-bed or other suitable kiln chlorinator. The titanium dioxide contained in the raw material reacts to form titanium tetrachloride, while the oxygen forms carbon dioxide with the coke. Iron and other impurity metals present in the ore are also converted during chlorination to their corresponding chlorides. The titanium chloride is then condensed and purified by means of distillation in column 18. With current practice, the purified titanium chloride vapor would be condensed again and sold to titanium manufacturers; however, in this integrated process, the titanium tetrachloride vapor stream is used directly in the manufacturing process via a feed pump 21 and boiler 22.

After providing process heat for the distillation step in heat exchangers 19 and 20, the temperature of the bulk process stream is adjusted to the desired temperature for the reaction chamber 14 at heat exchanger 10, and then combined with the regenerated sodium recycle stream, and injected into the reaction chamber. The recovered heat from heat exchangers 19 and 20 may be used to vaporize liquid. It should be understood that various pumps, filters, traps, monitors and the like will be added as needed by those skilled in the art.

Figure 2:
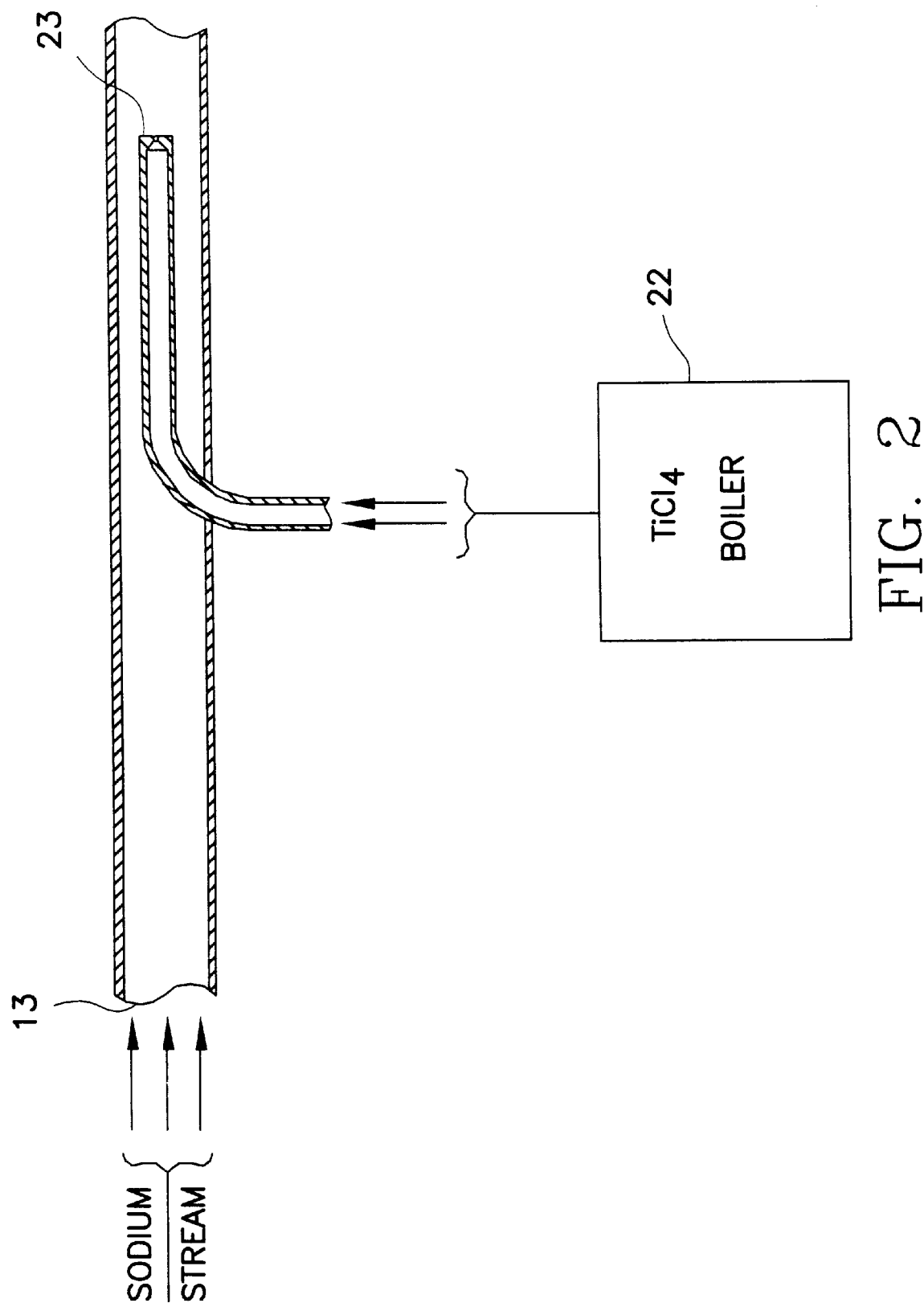
FIG. 2 is an example of a burner reaction chamber for a continuous process.

In all aspects, for the process of FIG. 1, it is important that the titanium that is removed from the separator 15 be at or below the sintering temperature of titanium in order to preclude and prevent the solidification of the titanium on the surfaces of the equipment and the agglomeration of titanium particles into large masses, which is one of the fundamental difficulties with the commercial processes used presently. By maintaining the temperature of the titanium metal below the sintering temperature of titanium metal, the titanium will not attach to the walls of the equipment or itself as it occurs with prior art and, therefore, the physical removal of the same will be obviated. This is an important aspect of this invention and is obtained by the use of sufficient sodium metal or diluent gas or both to control the temperature of the elemental (or alloy) product. In other aspects, FIG. 1, is illustrative of the types of design parameters which may be used to produce titanium metal in a continuous process which avoids the problems with the prior art. Referring now to FIG. 2, there is disclosed a typical reaction chamber in which a choke flow or injection nozzle 23, completely submerged in a flowing liquid metal stream, introduces the halide vapor from a boiler 22 in a controlled manner into the liquid metal reductant stream 13. The reaction process is controlled through the use of a choke-flow (sonic or critical flow) nozzle. A choke-flow nozzle is a vapor injection nozzle that achieves sonic velocity of the vapor at the nozzle throat. That is, the velocity of the vapor is equal to the speed of sound in the vapor medium at the prevailing temperature and pressure of the vapor at the nozzle throat. When sonic conditions are achieved, any change in downstream conditions that causes a pressure change cannot propagate upstream to affect the discharge. The downstream pressure may then be reduced indefinitely without increasing or decreasing the discharge. Under choke flow conditions only the upstream conditions need to be controlled to control the flow-rate. The minimum upstream pressure required for choke flow is proportioned to the downstream pressure and termed the critical pressure ratio. This ratio may be calculated by standard methods.

The choke flow nozzle serves two purposes: (1) it isolates the vapor generator from the liquid metal system, precluding the possibility of liquid metal backing up in the halide feed system and causing potentially dangerous contact with the liquid halide feedstock, and (2) it delivers the vapor at a fixed rate, independent of temperature and pressure fluctuations in the reaction zone, allowing easy and absolute control of the reaction kinetics.

The liquid metal stream also has multiple functional uses: (1) it rapidly chills the reaction products, forming product powder without sintering, (2) it transports the chilled reaction products to a separator, (3) it serves as a heat transfer medium allowing useful recovery of the considerable reaction heat, and (4) it feeds one of the reactants to the reaction zone.

For instance in FIG. 2, the sodium 13 entering the reaction chamber is at 200° C. having a flow rate of 38.4 kilograms per minute. The titanium tetrachloride from the boiler 22 is at 2 atmospheres and at a temperature of 164° C., the flow rate through the line was 1.1 kg/min. Higher pressures may be used, but it is important that back flow be prevented, so the minimum pressure should be above that determined by the critical pressure ratio for sonic conditions, or about two times the absolute pressure of the sodium stream (two atmospheres if the sodium is at atmospheric pressure) is preferred to ensure that flow through the reaction chamber nozzle is critical or choked.

Figure 3:
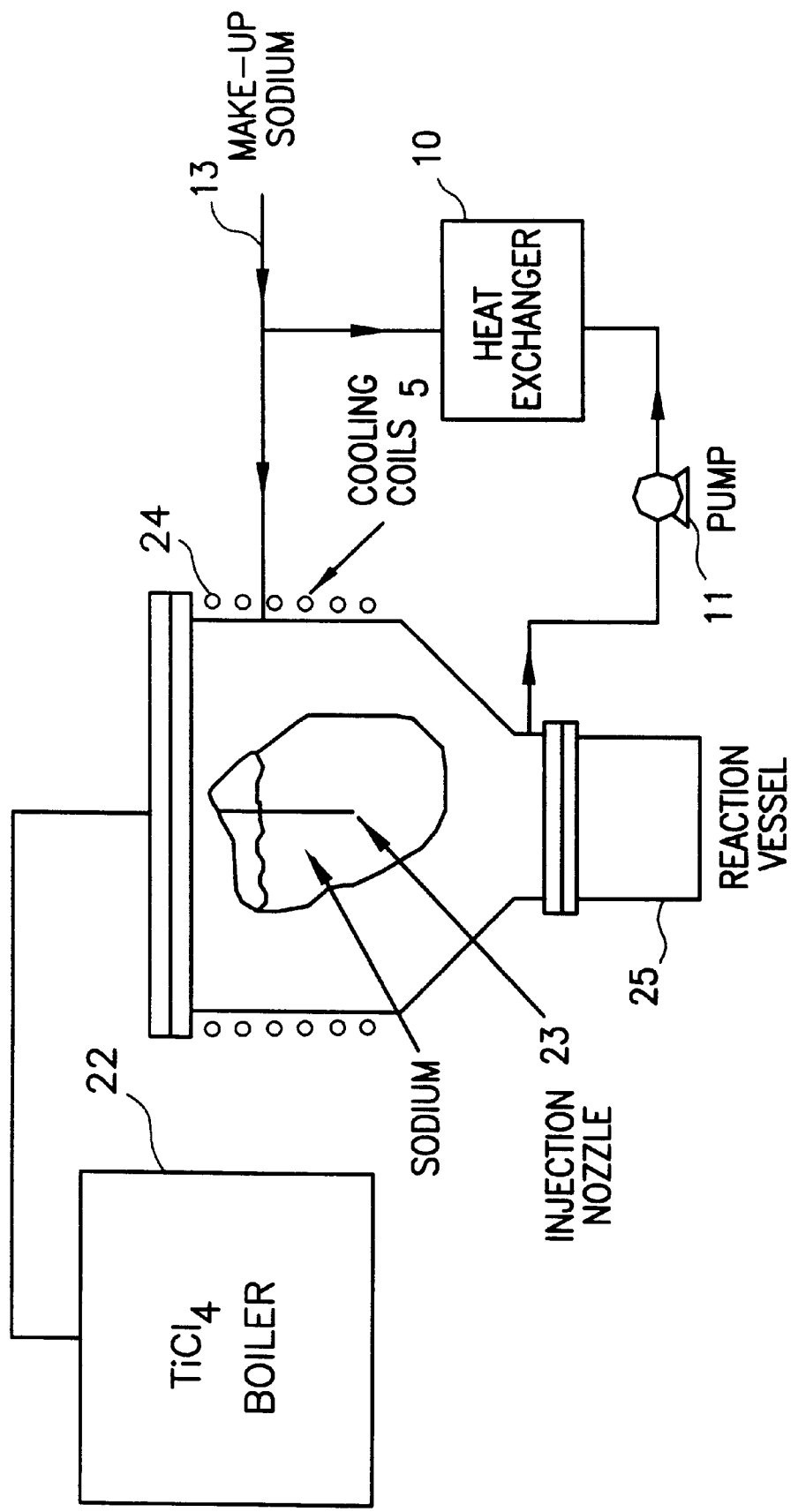
FIG. 3 is a process diagram of a batch process reaction.

The batch process illustrated in FIG. 3 shows a subsurface introduction of titanium tetrachloride vapor through an injection or a choke flow nozzle 23 submerged in liquid sodium contained in a reaction vessel 24. The halide vapor from the boiler 22 is injected in a controlled manner where it reacts producing titanium powder and sodium chloride. The reaction products fall to the bottom of the tank 25 where they are collected for removal. The tank walls are cooled via cooling coils 24 and a portion of the sodium in the tank is pumped out via pump 11 and recycled through a heat exchanger 10 and line 5 back to the tank to control the temperature of the sodium in the reaction vessel. Process temperatures and pressures are similar to the continuous flow case with bulk sodium temperature of 200° C., titanium tetrachloride vapor of 164° C., and the feed pressure of the titanium tetrachloride vapor about twice the pressure in the reaction vessel.

In the flow diagrams of FIGS. 1 and 3, sodium make-up is indicated by the line 13 and this may come from an electrolytic cell 16 or some other entirely different source of sodium. In other aspects, FIG. 3 is illustrative of the types of design parameters which may be used to produce titanium metal in a batch process which avoids agglomeration problems inherent in the batch process presently in use commercially.

BRIEF DESCRIPTION OF THE PRODUCTION OF TITANIUM

Figure 4:
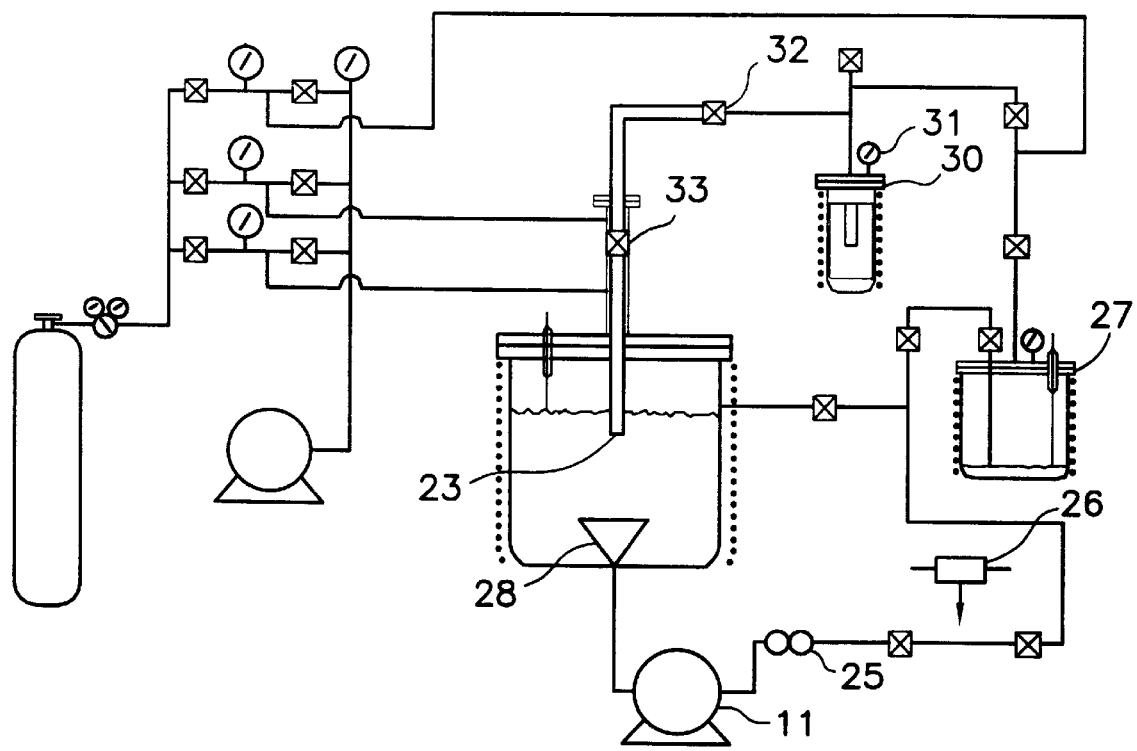
FIG. 4 is a diagram of the apparatus used to produce titanium.

FIG. 4, shows a schematic depiction of a loop used to produce titanium metal powder. The parts of the loop of most importance to the operation are a large (10 liter) reaction vessel 29 with a collection funnel 28 at the bottom feeding into a recycle stream. The recycle stream has a low volume, low head, electromagnetic pump 11 and a flow meter 25.

A titanium tetrachloride injection system consisted of a heated transfer line, leading from a heated tank 30 with a large heat capacity, to a submerged choke flow nozzle 23. The system could be removed completely from the sodium loop for filling and cleaning.

Operation

A typical operating procedure follows:
1. Raise temperature of sodium loop to desired point (200° C.).
2. Open titanium tetrachloride tank and fill with titanium tetrachloride.
3. Insert the nozzle into the airlock above the ball valve 33.
4. Heat titanium tetrachloride tank to desired temperature (168° C.) as determined by vapor pressure curve (2 atm.) and the required critical flow pressure.

5. Start an argon purge through the nozzle.
6. Open ball valve 33 and lower the nozzle into sodium.
8. Stop the purge and open valve 32 allowing titanium tetrachloride to flow through the nozzle into the sodium.
9. When titanium tetrachloride pressure drops close to the critical pressure ratio, close the valve 32 and withdraw the nozzle above valve 33.
10. Close valve 33 and let the nozzle cool to room temperature.
11. Remove the titanium tetrachloride delivery system and clean.

The injection of titanium tetrachloride was monitored by measuring the pressure in the titanium tetrachloride system. A pressure transducer 31 was installed and a continuous measurement of pressure was recorded on a strip chart.

A filtration scheme was used to remove products from the bulk sodium at the end of the test. The recycle stream system was removed from the sodium loop. In its place, a filter 26 consisting of two 5 cm diameter screens with 100 $\mu$m holes in a housing 20 cm long, was plumbed into a direct line connecting the outlet of the reaction vessel to the sodium receiver tank. All of the sodium was transferred to the transfer tank 27.

The reaction product was washed with ethyl alcohol to remove residual sodium and then washed with water to remove the sodium chloride by-product. Particle size of the substantially pure titanium ranged between 1 and 10 $\mu$m with a mean size of about 5.5 $\mu$m. The titanium powder produced in the apparatus was readily separable from the sodium and sodium chloride by-product.

The invention has been illustrated by reference to titanium alone and titanium tetrachloride as a feedstock, in combination with sodium as the reducing metal. However, it should be understood that the foregoing was for illustrative purposes only and the invention clearly pertains to those metals and nonmetals in Table 1, which of course include the fluorides of uranium and rhenium and well as other halides such as bromides. Moreover, sodium while being the preferred reducing metal because of cost and availability, is clearly not the only available reductant. Lithium, potassium as well as calcium and other alkaline earth metals are available and thermodynamically feasible. It is well within the skill of the art to determine from the thermodynamic Tables which metals are capable of acting as a reducing agent in the foregoing reactions, the principal applications of the process being to those illustrated in Table 1 when the chloride or halide is reduced to the metal. Moreover, it is well within the skill of the art and it is contemplated in this invention that alloys can be made by the process of the subject invention by providing a suitable halide feed in the molecular ratio of the desired alloy.

While there has been disclosed what is considered to be the preferred embodiment of the present invention, it is understood that various changes in the details may be made without departing from the spirit, or sacrificing any of the advantages of the present invention.

We claim:

1. A method of producing an elemental material of Ti, Al, Sb, Be, B, Ga, Mo, Nb, Ta, Zr, V, Ir, Os, Re and U or an alloy thereof from a halide vapor of the elemental material or mixtures thereof comprising submerging the halide vapor or mixtures thereof in liquid alkali metal or liquid alkaline earth metal or mixtures thereof to convert the halide vapor to elemental material or an alloy.

2. The method of claim 1, wherein the liquid alkali metal is Na, K or mixtures thereof and the liquid alkaline earth metal is Mg, Ca, Ba or mixtures thereof.

3. The method of claim 2, wherein the halide vapor is supplied at a pressure sufficient to maintain sonic flow and the elemental material produced is maintained at a temperature such that it does not sinter.

4. The method of claim 3, wherein the elemental material is produced in batches.

5. The method of claim 3, wherein the elemental material is produced continuously.

6. The method of claim 1, wherein the halide vapor is intimately mixed with the liquid alkali metal or liquid alkaline earth metal in a zone enclosed by the liquid during formation of the elemental material.

7. The method of claim 1, wherein the temperature of elemental material is at least partly controlled by the quantity of the liquid metal contacting the elemental material during formation thereof.

8. A method of continuously producing a non-metal or a metal or an alloy thereof comprising, providing a supply of halide vapor of the metal or non-metal or mixtures thereof, providing a supply of liquid alkali or alkaline earth metal or mixtures thereof, introducing the halide vapor submerged in the liquid alkali metal or alkaline earth metal or mixtures thereof at a velocity not less than the sonic velocity of the halide vapor to produce a powder of a non-metal or a metal or an alloy thereof and a halide of the alkali or alkaline earth metal by an exothermic reaction, separating the powder from the reactants, separating the alkali metal halide or the alkaline earth metal halide into its constituent parts, cooling and recycling the alkali metal or the alkaline earth metal to react with additional halide vapor.

9. The method of claim 8, wherein the halide vapor is one or more of $TiCl_4$, $VCl_4$, $NbCl_5$, $MoCl_4$, $GaCl_{31}$ $UF_6$, $ReF_6$.

10. The method of claim 9, wherein the halide vapor is $TiCl_4$, the liquid alkali metal is Na and the temperature of the liquid Na away from where the halide vapor is introduced is maintained in the range of from about 200° C. to about 400° C.

11. The method of claim 8, and further comprising contacting the halide obtained from separating the alkali metal halide or alkaline earth metal halide into its constituent parts with ore of the elemental metal or alloy.

12. A method of producing Ti powder from a source of $TiCl_4$ vapor, comprising introducing the $TiCl_4$ vapor submerged in liquid Na to produce Ti powder and separating the Ti powder from the liquid Na.

13. The method of claim 12, wherein the liquid Na is flowing in a stream.

14. The method of claim 13, wherein substantially all of the Ti powder has a particle diameter in the range of from about 1 to about 10 microns.

15. The method of claim 13, wherein the $TiCl_4$ vapor is introduced into the flowing stream of liquid Na by injection.

16. The method of claim 15, wherein the flowing stream of Na is present in excess over the stoichiometric quantity needed to react with the $TiCl_4$ vapor such that the Ti powder produced does not sinter.

17. The method of claim 12, wherein the liquid Na is present as a batch.

18. A method of continuously producing a non-metal or a metal or an alloy thereof comprising, providing a supply of halide vapor of the metal or non-metal or mixtures thereof, providing a supply of liquid alkali metal or alkaline earth metal or mixtures thereof, introducing the halide vapor submerged in the liquid alkali metal or alkaline earth metal or mixtures thereof to produce a powder of a non-metal or a metal or an alloy thereof and a halide of the alkali or alkaline earth metal, said alkali or alkaline earth metal being present in sufficient quantities in excess of the stoichiometric quantity necessary to reduce the halide vapor to quench the reaction products below the sintering temperature of the non-metal or metal or alloy thereof, to capture heat from the reactor, separating the alkali metal halide or the alkaline earth metal halide into its constituent parts, recovering heat from the excess alkali or alkaline earth metal and recycling the alkali metal or the alkaline earth metal to react with additional halide vapor, and using the recovered heat to vaporize liquid halide from the source thereof to produce halide vapor to react with ore of the metal or non-metal.

19. The method of claim 18, wherein the halide is the chloride of one or more of Ti or Zr.

20. The method of claim 19, wherein the alkali or alkaline earth metal is present as a flowing stream and the chloride vapor is introduced by injection thereinto.

21. A method of producing an elemental material or an alloy thereof from a halide vapor of the elemental material or a mixture of halide vapors of two or more elemental materials comprising the steps of introducing the halide vapor or mixture of halide vapors into a reaction zone into the interior of a flowing stream of a liquid alkali metal, two or more liquid alkaline earth metals, or any mixture thereof; intimately mixing the halide vapor or mixture of halide vapors with the flowing stream to cause a reduction reaction therebetween and form the elemental material or alloy thereof and a salt of the alkali metal, two or more alkali metals, alkaline earth metal, two or more alkaline earth metals or any mixture thereof; and separating the elemental material or alloy thereof from the salt.

22. The method of claim 21, wherein the temperature of the elemental material or alloy does not exceed its sintering temperature.

23. The method of claim 21, wherein the elemental material is one or more members selected from the group consisting of Ti, Al, Sb, Be, B, Ga, Mo, Nb, Ta, Zr, V, Ir, Os, Re and U.

24. The method of claim 21, wherein said alkali metal is at least one member selected from the group consisting of Na, K and Li and said alkaline earth metal is at least one member selected from the group consisting of Ca, Sr and Ba.

25. The method of claim 21, wherein the halide is one or more members selected from the group consisting of Cl, Br and F.

26. The method of claim 21, wherein the halide vapor is mixed with an inert gas.

27. The method of claim 26, wherein said inert gas is He or Ar.

28. In a method of producing an elemental material or an alloy thereof in which a halide vapor of the elemental material or a mixture of halide vapors of two or more elemental materials are reacted with a liquid alkali metal, two or more liquid alkali metals, a liquid alkaline earth metal, two or more liquid alkaline earth metals, or any mixture thereof to form the elemental material or alloy thereof, the improvement comprising commencing the reaction between the halide vapor or mixture of halide vapors and the liquid alkali metal, two or more liquid alkali metals, alkaline earth metals, two or more alkaline earth metals, or any mixture thereof, at the interior of a flowing stream of the liquid alkali metal, two or more liquid alkali metals, alkaline earth metal, two or more alkaline earth metals, or any mixtures thereof.

29. The method of claim 28, wherein the temperature of the elemental material or alloy thereof does not exceed its sintering temperature.

30. The method of claim 28, wherein the elemental material is one or more members selected from the group consisting of Ti, Al, Sb, Be, B, Ga, Mo, Nb, Ta, Zr, V, Ir, Os, Re and U.

31. The method of claim 28, wherein said alkali metal is at least one member selected from the group consisting of Na, K and Li and said alkaline earth metal is at least one member selected from the group consisting of Ca, Sr and Ba.

32. The method of claim 28, wherein the halide is one or more members selected from the group consisting of Cl, Br and F.

33. The method of claim 28, wherein the halide vapor is mixed with an inert gas.

34. The method of claim 33, wherein said inert gas is He or Ar.

35. A method of producing an elemental material of Ti, Al, Sb, Be, B, Ga, Mo, Nb, Ta, Zr, V, Ir, Os, Re and U or an alloy thereof from a halide vapor of the elemental material or mixtures thereof comprising introducing the halide vapor or mixtures thereof into a liquid continuum of alkali metal or liquid earth metal or mixtures thereof to convert the halide vapor to elemental material or an alloy wherein the liquid continuum is present in sufficient quantity to maintain the temperature of substantially all of the reaction products below the sintering temperature thereof.

36. The method of claim 35, wherein the alkali metal is Na, K or mixtures thereof and the alkaline earth metal is Mg, Ca, Ba or mixtures thereof.

37. A method of producing Ti powder from a source of $TiCl_4$ vapor, comprising introducing the $TiCl_4$ vapor within a continuum of liquid Na to produce Ti powder by a subsurface reaction and separating the Ti powder from the liquid Na.

38. The method of claim 37, wherein substantially all of the Ti powder has a particle diameter in the range of from about 1 to about 10 microns.

39. The method of claim 37, wherein the $TiCl_4$ vapor is introduced into a flowing stream of liquid Na by injection.

40. The method of claim 39, wherein the flowing stream of Na is present in excess over the stoichiometric quantity needed to react with the $TiCl_4$ vapor such that the Ti powder produced does not sinter.

* * * * *

(12) EX PARTE REEXAMINATION CERTIFICATE (7431st)
United States Patent
Armstrong et al.

(10) Number: US 5,958,106 C1
(45) Certificate Issued: *Mar. 30, 2010

(54) METHOD OF MAKING METALS AND OTHER ELEMENTS FROM THE HALIDE VAPOR OF THE METAL

(75) Inventors: Donn Reynolds Armstrong, Lisle, IL (US); Stanley S. Borys, Naperville, IL (US); Richard Paul Anderson, Clarendon Hills, IL (US)

(73) Assignee: International Titanium Powder, L.L.C., Willowbrook, IL (US)

Reexamination Request:
No. 90/006,911, Jan. 15, 2004

Reexamination Certificate for:
Patent No.: 5,958,106
Issued: Sep. 28, 1999
Appl. No.: 08/782,816
Filed: Jan. 13, 1997

(*) Notice: This patent is subject to a terminal disclaimer.

Related U.S. Application Data

(63) Continuation-in-part of application No. 08/691,423, filed on Aug. 2, 1996, now Pat. No. 5,779,761, which is a continuation of application No. 08/283,358, filed on Aug. 1, 1994, now abandoned.

(51) Int. Cl.
*C22B 5/04* (2006.01)
*C22B 34/12* (2006.01)
*C22B 5/00* (2006.01)
*C22B 34/00* (2006.01)

(52) U.S. Cl. .............. 75/370; 75/371; 75/619; 75/620; 75/616; 75/605; 75/613

(58) Field of Classification Search .............. None
See application file for complete search history.

(56) References Cited

U.S. PATENT DOCUMENTS 3,847,596 A * 11/1974 Holland et al. .............. 75/619

FOREIGN PATENT DOCUMENTS

| EP | 778021 | 7/1957 |
| GB | 722184 | 1/1955 |
| NO | 90840 | * 1/1958 |

* cited by examiner

*Primary Examiner*—Jerry D. Johnson

(57) ABSTRACT

A method of producing a non-metal element or metal or an alloy thereof from a halide or mixtures thereof. The halide or mixtures thereof are contacted with a stream of liquid alkali metal or alkaline earth metal or mixtures thereof in sufficient quantity to convert the halide to the non-metal or the metal or alloy and to maintain the temperature of the reactants at a temperature lower than the sintering temperature of the produced non-metal or metal or alloy. A continuous method is disclosed, particularly applicable to titanium.

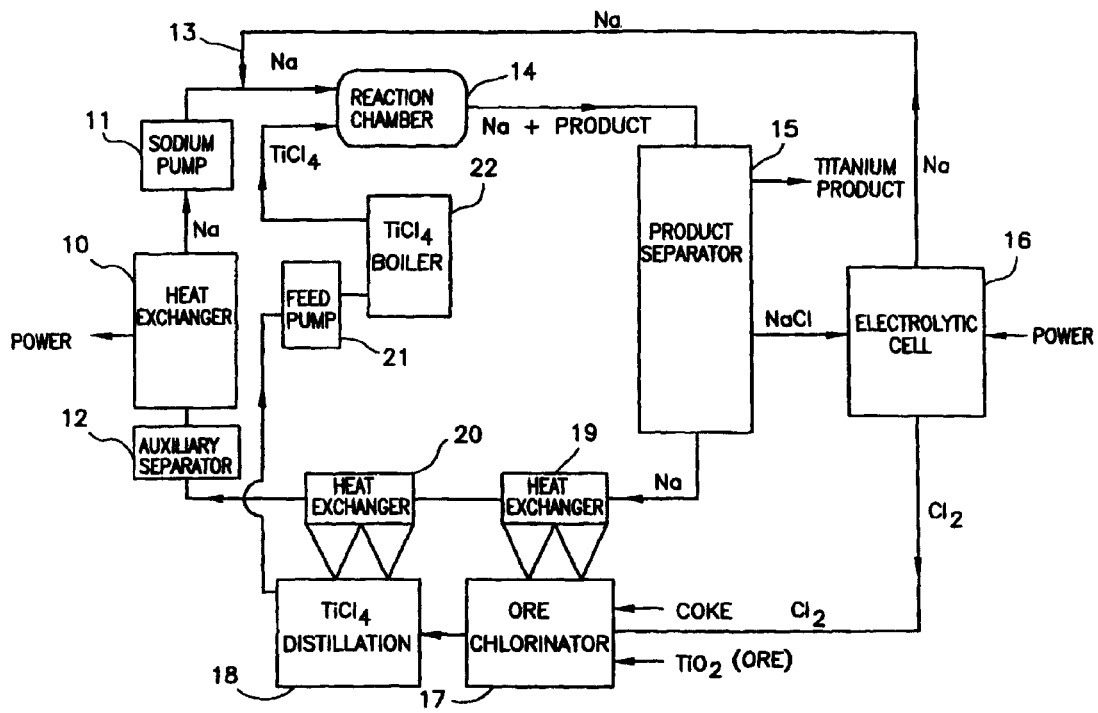

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8–11 is confirmed.

Claims 1, 12, 18, 21, 28, 35 and 37 are determined to be patentable as amended.

Claims 2–7, 13–17, 19, 20, 22–27, 29–34, 36 and 38–40, dependent on an amended claim, are determined to be patentable.

New claim 41 is added and determined to be patentable.

1. A method of producing an elemental material of Ti, Al, Sb, Be, B, Ga, Mo, Nb, Ta, Zr, V, Ir, Os, Re and U or an alloy thereof from a halide vapor of the elemental material or mixtures thereof comprising submerging the halide vapor or mixtures thereof in *a stream of flowing* liquid *metal consisting essentially of a liquid* alkali metal or liquid alkaline earth metal or mixtures thereof *in a reaction zone* to convert the halide vapor to elemental material or an alloy, *wherein the stream of flowing liquid metal carries the elemental material or alloy away from the reaction zone.*

12. A method of producing Ti powder from a source of TiCl$_4$ vapor, comprising introducing the TiCl$_4$ vapor *at least at sonic velocity* submerged in liquid Na to produce Ti powder and separating the Ti powder from the liquid Na.

18. A method of continuously producing a non-metal or a metal or an alloy thereof comprising, providing a suppy of halide vapor of the metal or non-metal or mixtures thereof, providing a *flowing* supply of liquid *metal consisting essentially of an* alkali metal or alkaline earth metal or mixtures thereof, introducing the halide vapor submerged in the *flowing* liquid [alkali metal or alkaline earth metal or mixtures thereof] *metal* to produce a powder of a non-metal or a metal or an alloy therof and a halide of the alkali or alkaline earth metal, said [alkali or alkaline earth] *liquid* metal *carrying the powder away from the location where the halide vapor is introduced and* being present in sufficient quantities in excess of the stoichiometric quantity necessary to reduce the halide vapor to quench the reaction products below the sintering temperature of the non-metal or metal or alloy thereof, to capture heat from the reactor, separating the alkali metal halide or the alkaline earth metal halide into its constituent parts, recovering heat from the excess alkali or alkaline earth metal and recycling the alkali metal or the alkaline earth metal to react with additional halide vapor, and using the recovered heat to vaporize liquid halide from the source thereof to produce halide vapor to react with one of the metal or non-metal.

21. A method of producing an elemental meterial or an alloy thereof from a halide vapor of the elemental material or a mixture of halide vapors of two or more elemental materials comprising the steps of introducing the halide vapor or mixture of halide vapors into a reaction zone into the interior of a flowing stream of a liquid *metal consisting essentially of an* alkali metal, two or more liquid alkaline earth metals, or any mixture thereof; intimately mixing the halide vapor or mixture of halide vapors with the flowing stream to cause a reduction reaction therebetween and form the elemental material or alloy thereof and a salt of the alkali metal, two or more alkali metals, alkaline earth metal, two or more alkaline earth metals or any mixture thereof; and separating the elemental material or alloy thereof from the salt; *wherein the flowing stream carries the elemental material or alloy away from the reaction zone.*

28. In a method of producing an elemental material or an alloy thereof in which a halide vapor of the elemental material or a mixture of halide vapors of two or more elemental materials are reacted with a liquid *metal consisting essentially of an* alkali metal, two or more liquid alkali metals, a liquid alkaline earth metal, two or more liquid alkaline earth metals, or any mixture thereof to form the elemental material or alloy thereof, the improvement comprising commencing the reaction between the halide vapor or mixture of halide vapors and the liquid [alkali metal, two or more liquid alkali metals, alkaline earth metals, two or more alkaline earth metals, or any mixture thereof] *metal*, at the interior of a flowing stream of the liquid [alkali metal, two or more liquid alkali metals, alkaline earth metal, two or more alkaline earth metals, or any mixtures thereof] *metal, wherein the flowing stream carries the elemental material or alloy away from the region where the reaction is commenced.*

35. A method of producing an elemental material of Ti, Al, Sb, Be, B, Ga, Mo, Nb, Ta, Zr, V, Ir, Os, Re and U or an alloy thereof from a halide vapor of the elemental material or mixtures thereof comprising introducing the halide vapor or mixtures thereof into a *flowing* liquid continuum *consisting essentially* of *liquid* alkali metal or liquid earth metal or mixtures thereof to convert the halide vapor to elemental material or an alloy wherein the liquid continuum is present in sufficient quantity to maintain the temperature of substantially all of the reaction products below the sintering temperature thereof *and the flowing liquid continuum carries the elemental material or alloy away from the region where the halide vapor is introduced.*

37. A method of producing Ti powder from a source of TiCl$_4$ vapor, comprising introducing the TiCl$_4$ vapor *in a reaction zone* within a continuum *consisting essentially* of flowing liquid Na to produce Ti powder by a subsurface reaction, *the flowing liquid sodium carrying the Ti powder away from the reaction zone,* and separating the Ti powder from the liquid Na.

*41. A method of producing an elemental material of Ti, Al, Sb, Be, B, Ga, Mo, Nb, Ta, Zr, V, Ir, Os, Re and U or an alloy thereof from a halide vapor of the elemental material or mixtures thereof comprising introducing the halide vapor or mixtures thereof at least at sonic velocity into liquid alkali metal or liquid alkaline earth metal or mixtures thereof to convert the halide vapor to elemental material or an alloy.*

\* \* \* \* \*